(12) United States Patent
Simons

(10) Patent No.: US 8,437,912 B2
(45) Date of Patent: May 7, 2013

(54) HYDRAULIC PROPULSION, GYROSCOPIC ENERGY STORAGE VEHICLE DRIVE SYSTEM

(76) Inventor: Gerald Frank Simons, Bosque Farms, NM (US)

( * ) Notice: Subject to any disclaimer, the term of this patent is extended or adjusted under 35 U.S.C. 154(b) by 366 days.

(21) Appl. No.: 12/799,881

(22) Filed: May 4, 2010

(65) Prior Publication Data

US 2010/0286888 A1  Nov. 11, 2010

Related U.S. Application Data

(60) Provisional application No. 61/215,462, filed on May 6, 2009.

(51) Int. Cl.
*B60G 17/016* (2006.01)

(52) U.S. Cl.
USPC ............ 701/38; 701/124; 180/6.5; 280/5.502

(58) Field of Classification Search .................... 701/38, 701/74, 124; 180/6.5, 165, 282; 280/5.502, 280/5.506, 5.509
See application file for complete search history.

(56) References Cited

U.S. PATENT DOCUMENTS

| | | | | |
|---|---|---|---|---|
| 3,881,736 A * | 5/1975 | Wilfert | ........................ | 280/5.507 |
| 3,921,746 A * | 11/1975 | Lewus | .......................... | 180/165 |
| 4,223,532 A * | 9/1980 | Shiber | ............................. | 60/414 |
| 4,282,948 A * | 8/1981 | Jerome | .......................... | 180/165 |
| 6,615,937 B2 * | 9/2003 | Richey et al. | .................. | 180/6.5 |
| 7,698,036 B2 * | 4/2010 | Watson et al. | .................. | 701/45 |
| 2001/0044685 A1 * | 11/2001 | Schubert | ......................... | 701/50 |
| 2004/0041358 A1 * | 3/2004 | Hrovat et al. | .............. | 280/5.502 |
| 2004/0167701 A1 * | 8/2004 | Mattson et al. | ................. | 701/71 |
| 2005/0012392 A1 * | 1/2005 | Kato et al. | .................... | 303/191 |
| 2005/0057045 A1 * | 3/2005 | Thomas et al. | ............... | 290/1 R |
| 2006/0085112 A1 * | 4/2006 | Lu et al. | ......................... | 701/38 |
| 2010/0044977 A1 * | 2/2010 | Hughes et al. | ............. | 280/5.509 |
| 2010/0145574 A1 * | 6/2010 | Mattson et al. | ................. | 701/38 |
| 2010/0193270 A1 * | 8/2010 | Deshaies et al. | ......... | 180/65.265 |
| 2011/0016996 A1 * | 1/2011 | Suda et al. | ....................... | 74/5.1 |

* cited by examiner

*Primary Examiner* — Helal A Algahaim
(74) *Attorney, Agent, or Firm* — Kevin Lynn Wildenstein

(57) ABSTRACT

A high efficiency vehicle propulsion system to propel a vehicle using a hydraulic motor pump functioning as motor connected to the vehicle wheels. Vehicle braking and deceleration energy is recaptured using the same hydraulic motor pump functioning as a pump and stored in an inertia wheel configured as a gyroscope. Energy is stored in and retrieved from the inertia wheel by the use of a hydraulic motor pump functioning as a motor to store energy in the inertia wheel of the gyroscope or as a pump or to retrieve energy from the inertial wheel of the gyroscope. Energy to serve the system is derived from the use of a small engine running infrequently and intermittently. Additional energy is retrieved by the use of an active shock absorption system. Energy management and vehicle propulsion are controlled by a central computer processing signals derived from action of an on-board operator, an on-board program of from a remote source. Vehicle roll over accidents are inhibited by the use of the inertial stability of the gyroscope to prevent excessive vehicle roll attitude.

6 Claims, 1 Drawing Sheet

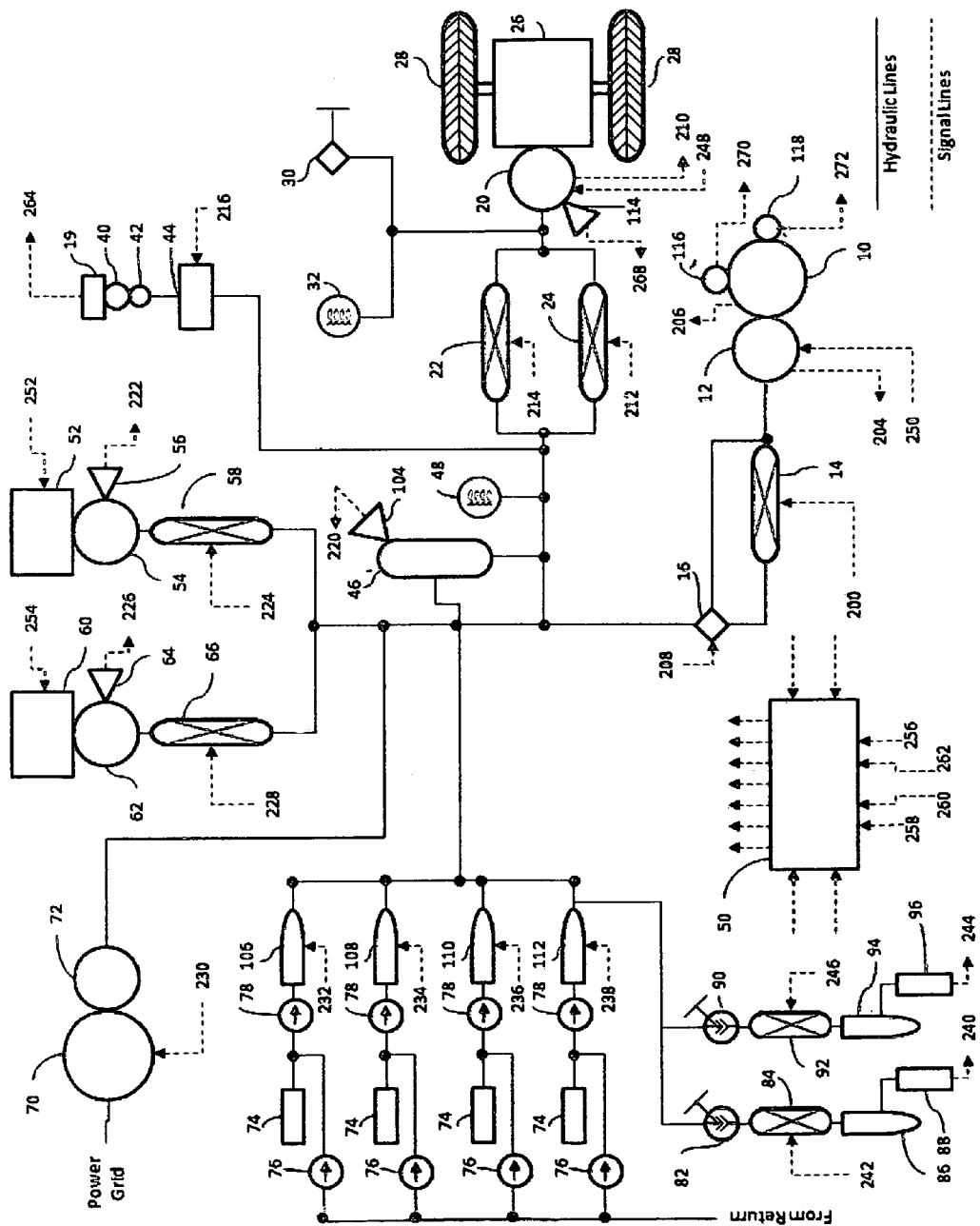

HYDRAULIC PROPULSION, GYROSCOPIC ENERGY STORAGE VEHICLE DRIVE SYSTEM

CROSS REFERENCE TO RELATED APPLICATIONS

This application claims the benefit of provisional patent application Ser. No. 61/215,462 filed May 6, 2009 by the present inventor

STATEMENT REGARDING FEDERALLY SPONSORED RESEARCH AND DEVELOPMENT

Not applicable

BACKGROUND OF THE INVENTION

1. Field of the invention (Technical Field)

The present invention relates to propulsion systems, specifically propulsion systems for vehicles maximizing energy savings while propelling the vehicle by the use of a hydraulic motor. It uses energy derived from intermittent use of a small engine and stored in an inertia wheel, which also functions as an energy storage gyroscope. The vehicle propulsion and energy management is controlled by an on board computer Additional energy is derived from the electric grid or from bumps in the road with ride stiffness capable of being computer controlled.

2. Background

The conventional automobile has evolved from the horseless carriage of more than 100 years ago to a complicated vehicle with computer-controlled features. The systems employed in the use of the vehicle remain essentially the same as the first automobile with improvements being made in individual components. There are better engines, better transmissions, better suspensions, and better safety features. The propulsion remains that of connecting the engine through a transmission to the wheels of the vehicle and controlling the speed of the vehicle by controlling the speed of the engine. A huge engine is required to ensure adequate power to safely accelerate in traffic. While at low speed, that same huge engine runs at efficiencies as low as 10 to 15% and emits an enormous amount of contaminates into the air. That same huge engine idles burning fuel the entire time the vehicle is stopped in traffic.

Battery hybrid drive systems have been employed in an attempt to overcome the need for the large engine by utilizing the technique of boosting the available engine power when needed by using energy stored in batteries. That has not been successful for several reasons. Batteries may have a large quantity of stored energy but only the top 10-to 15% is available for use by the system. The remaining energy in storage is not available and if attempt is made to use it the battery is destroyed. Batteries are expensive and immediately begin to degrade. At the end of as little as 8 years, the battery pack is useless and has to be replaced. In the first 8 years, the energy level available for use by the system continues to degrade so that at 4 years the energy storage level is half of its original value. Performance of the vehicle suffers accordingly. To charge the depleted battery takes a relatively long time. Batteries may be only recharged at a rate equal to 10% of their storage capacity. Therefore the battery hybrid drive system may only be used for short intervals leaving time to recharge the batteries or run the engine continuously to maintain the charge. Batteries have a relatively short life cycle and even with is most robust configuration still require a relatively large engine running most of the time. Emissions are only slightly reduced.

SUMMARY OF THE INVENTION

The vehicle propulsion system of the present invention uses large energy storage contained in a conventional flywheel. That flywheel is the spinning member of a gyroscope. The energy stored in the flywheel is available to propel the vehicle yet has the additional capability of providing bursts of energy needed for accelerations, Additionally the inertial stability of the gyroscope prohibits accidental vehicle roll over. There is no energy loss while idling or waiting in traffic. A small engine using any type fuel for which it was designed, running infrequently and intermittently while at its most efficient speed replaces energy spent from the flywheel. When the energy in the flywheel has been replaced the engine is stopped while the vehicle continues to run on the stored energy derived from the flywheel. Energy is applied to and taken from the flywheel by means of a hydraulic motor pump. A second hydraulic motor pump provides energy to drive, accelerate or brake the vehicle. That motor functions as a motor to accelerate or drive the vehicle and as a pump to capture the kinetic energy of the vehicle when decelerating or braking. The command signals, engine control and energy management are under the control of a central computer processor.

The flywheel as an energy storage system is inexpensive, never degrades and in the life of the vehicle never needs to be replaced. The engine runs infrequently and only at its most efficient speed resulting in a life cycle many times the normal engine life. Because the engine is a small, runs so infrequently and then only at its peak efficiency speed, emissions are reduced to a small fraction of the emissions of the conventional vehicle.

DRAWINGS

FIG. 1 is a functional block diagram of the system. Only the hydraulic functional interconnects are shown without the hydraulic return part of the system. Control signals are shown associated with the component they control.

DETAILED DESCRIPTION

To propel a vehicle energy is required. In the present system that energy may be derived from Engine A 52, Engine B 60 or from Gyroscope 10. Engines A 52 or Engine B 60 may be any prime mover capable of operating a hydraulic pump As a prime mover it need not be a conventional engine but could be a fuel cell with an associated electric drive motor, a pneumatic rotational device, a turbine or other mechanical means of driving a hydraulic pump. For easier understanding the engine in the present invention will be considered to be a typical fossil fueled conventional engine.

Each hydraulic component has a pressure port and a port connected to the system storage tank. The port connected to the system storage tank will be called "return"

The sequence of events that occurs in the starting, running and stopping of the engine in use will be called the "Engine operation procedure".

Engine 52 or Engine B 60 may be a small commercially available engine with power capability in excess of that normally required to propel the vehicle. When the engine runs it runs only at its most efficient speed. Some of its output power may be used to propel the vehicle while the remaining available power is stored in Gyroscope 10 as kinetic energy. When Gyroscope 10 has reached its energy storage capacity, the then running engine is stopped and the vehicle is thereafter propelled using energy that was stored in Gyroscope 10. When the level of energy stored in Gyroscope 10 is depleted, either Engine A 52 or Engine B 60 is started to propel the vehicle and refill the energy level of Gyroscope 10. Under a circumstance such as a steep hill climb or a maximum rate acceleration in which more power is required than is available from one engine and the energy contribution from Gyroscope 10, both engines are run at the same time. Otherwise they are alternated.

Engine A52 in this description is a conventional fossil fueled engine conventionally connected directly to Engine A motor pump 54. Engine A motor pump 54 is a conventional hydraulic motor pump that may function either as a motor or pump depending upon the connections of its ports. When functioning as motor one of its ports is connected to hydraulic pressure while the other is connected to return. Alternatively when the motor pump is functioning as a pump those ports are reversed. The configuration of the ports is controlled by the internal configuration of Engine A directional control valve 58. Engine A directional control valve 58 is a conventional 4 way hydraulic valve that is configured by electrical signals from Computer 50. It also is spring loaded to an unpowered position that interconnects two of its ports and blocks the other two. The unpowered configuration will be called the bypass configuration.

To start Engine A 52, Engine A motor pump 54 functions as a motor performing the normal function of an engine starter. Computer 50 sends Engine A directional control valve signal 224 to Engine A directional control valve 58 to cause Engine A motor pump 54 to function as a motor. At the same time Computer 50 also sends Engine A ignition signal 252 to Engine A 52 to allow the engine to function. Engine A motor pump 54 and Engine A ignition signal 252 now cause Engine A52 to start. As engine A52 begins to run the pressure drop across Engine A motor pump 54 as measured by Engine A motor pump pressure sensor 56 begins to decrease. Engine A motor pump pressure signal 222 is sent to Computer 50. When Engine A motor pump pressure signal 222 reaches zero, Computer 50 sends Engine A directional control valve signal 224 to Engine A directional control valve 58 to switch Engine A motor pump 54 to be configured as a pump. As Engine A 52 runs fluid is pumped into the system providing for vehicle propulsion as well as increasing the speed and therefore the energy storage in Gyroscope 10. Gyro speed signal 204 is sent to Computer 50 and when Gyroscope 10 has increased its speed to a preset upper limit Computer 50 terminates Engine A ignition signal 252 causing Engine A 52 to stop. Computer 50 terminates Engine A directional control valve signal 224.which causes Engine directional control valve 58 to be configured in the bypass condition In the bypass condition, an internal spring alters the internal configuration so that the ports connecting pressure and return are blocked and the ports connected to Engine A motor pump 54 are interconnected.

The use of Engine A52 and Engine B 60 may alternate If Engine A 52 had been used to propel the vehicle and to fill the energy storage of Gyroscope 10 and having then been shut off, when the energy level of Gyroscope 10 had later fallen to a preset lower limit, Computer 50 activates Engine B 60.

Engine B 60 being initiated by Engine B ignition signal 254, and Engine B directional control valve 66 is started by having Engine B Motor pump 62 function as a motor. As Engine B 60 begins to run the pressure drop across Engine B motor pump 62 as measured by Engine B pressure sensor 64 decreases. Engine B motor pump pressure sensor signal 226 is sent to Computer 50. When Engine B motor pump pressure signal 226 reaches zero, Computer 50 sends Engine B directional control valve signal 228 to Engine B directional control valve 66 to switch Engine B motor pump 62 to be configured as a pump. As Engine B 60 runs fluid is pumped into the system providing for vehicle propulsion as well as increasing the speed and therefore the energy storage in Gyroscope 10. Gyro speed signal 204 is sent to Computer 50 and when Gyroscope 10 has increased its speed to the preset upper limit Computer 50 terminates Engine B ignition signal 254 causing Engine B 60 to stop. Computer 50 terminates Engine B directional control valve signal 228.which causes Engine B directional control valve 66 to be configured in the bypass condition In the bypass condition, an internal spring alters the internal configuration so that the ports connected to pressure and return are blocked and the ports connected to Engine B motor pump 62 are interconnected.

The energy stored in Gyroscope 10 is now available for use in propelling the vehicle.

The sequence of events allowing for the storage of energy in Gyroscope 10 is called the "Gyro energy storage sequence".

Gyroscope 10 is a flywheel spinning horizontally manufactured from a casting of commonly available metal. It is balanced using conventional balancing equipment and its axle shaft is supported in commercially available bearings contained in a pitch gimbal that is of configuration of a conventional gyroscope. The pitch gimbal has a nominal plus or minus 10 degree of freedom of motion relative to the frame of the vehicle. The pitch gimbal is mounted in a roll gimbal supported in conventional bearings. The roll gimbal is mounted in conventional bearings contained in structural support brackets attaching it to the vehicle frame. The roll gimbal has a nominal plus or minus 6 degrees of freedom relative to the frame of the vehicle. The entire Gyroscope 10 is mounted in the vehicle such that its inertial precession force as a gyroscope applies restraining forces equal to its inertial precession force on the vehicle to prevent the vehicle from pitch and roll attitude excursions in excess of Gyroscope 10 limits of freedom. It is necessary that the attitude of Gyroscope 10 be nominally level. In order to maintain that level attitude of Gyroscope 10, Pitch gimbal actuator 86 and Roll gimbal actuator 94 are installed in such configuration that their extension or retraction alters the attitude of Gyroscope 10.

The sequence followed in erecting the gyroscope to level attitude will be called "gyroscope leveling sequence"

Pitch gambal actuator 86 is a conventional hydraulic cylinder that extends or retracts in response to hydraulic pressure being applied to one or the other of its ports. If hydraulic pressure is applied to one of its ports and the other to return, Pitch gimbal actuator 86 extends and applies force to the pitch gimbal to alter its level attitude. If pressure is applied to the other port, Pitch gimbal actuator 86 retracts altering the level attitude of the pitch gimbal of Gyroscope 10. The selection of the ports and therefore the direction of the force applied to the pitch gimbal is selected by Pitch gimbal directional control valve 84. Pitch gimbal directional control valve 84 is a conventional 4 way hydraulic valve spring loaded to the bypass position when no electrical signal is applied. In the bypass position the active ports connected to the device being controlled are connected together while both pressure and return ports are blocked. When an appropriate electrical signal is applied to the valve it switches to an internal configuration that allows fluid to be ported to one of the ports of Pitch gimbal actuator 86 causing it to extend. The other port of Pitch gimbal actuator 86 is connected to return. An alternate signal causes the internal configuration of Pitch gimbal directional control valve 84 to port fluid to the port of Pitch gimbal actuator 86 that had previously been connected to return and also connecting the port that previously had pressure applied to it to be connected to return. Those port configurations cause Pitch gimbal actuator 86 to retract. If no signal is applied to Pitch gimbal directional control valve 84 the position of Pitch gimbal actuator 86 is free to move without restriction since its ports are interconnected in Pitch gimbal directional control valve 84. The vehicle to which Pitch gimbal actuator 86 is connected may move freely in pitch attitude within the limits of its mounts without exerting force on the pitch gimbal of Gyroscope 10.

Pitch gimbals level sensor 88 determines the direction and amount that Pitch gambal actuator 86 needs to move to cause the attitude of Gyroscope 10 to be level in pitch. Pitch gimbal level sensor 88 sends Pitch gimbal level sensor signal 240 to Computer 50 designating the direction and magnitude of the existing pitch gimbal attitude deviation from level. Computer 50 sends Pitch gimbal directional control valve signal 242 to Pitch gimbal directional control valve 84 to cause Pitch gimbal actuator 86 to extend or retract appropriately to return the attitude of the pitch gimbal to level and therefore a zero Pitch gimbal level sensor signal. 240. The rate at which Pitch gimbal actuator 86 moves to extend or retract is controlled by Pitch gimbal needle valve 82. Pitch gimbal needle valve 82 is a conventional needle valve that controls the flow rate of fluid through it by its internal conformation. It is manually set to adjust the attitude correction rate of the pitch attitude of Gyroscope 10. When Pitch gimbal level sensor signal 240 reaches zero, the pitch attitude of gyroscope 10 is level. Computer 50 terminates Pitch gimbal directional control valve signal 242. The termination of Pitch gimbal directional control valve signal 242 causes Pitch gimbal directional control valve 84 to be configured in the bypass condition. The ports connected to Pitch gimbal actuator 86 are now interconnected and Pitch gimbal actuator 86 is free to move unimpeded. The pressure and return ports of Pitch gimbal directional control valve 84 are blocked.

Roll gambal actuator 94 is a conventional hydraulic cylinder that extends or retracts in response to hydraulic pressure being applied to one or the other of its ports. If hydraulic pressure is applied to one of its ports and the other to return, Roll gimbal actuator 94 extends and applies force to the Roll gimbal to alter its level attitude. If pressure is applied to the other port, Roll gimbal actuator 94 retracts altering the level attitude of the Roll gimbal of Gyroscope 10. The selection of the ports and therefore the direction of the force applied to the pitch gimbal is selected by Roll gimbal directional control valve 92. Roll gimbal directional control valve 92 is a conventional 4 way hydraulic valve that when no electrical signal is applied is spring loaded to the bypass position. In the bypass position the active ports connected to the device being controlled are connected together while both pressure and return ports are blocked. When an appropriate electrical signal is applied to the valve it switches to an internal configuration that allows fluid to be ported to one of the ports of Roll gimbal actuator 94 causing it to extend. The other port of Roll gimbal actuator 94 is connected to return. An alternate signal causes the internal configuration of Roll gimbal directional control valve 92 to port fluid to the port of Roll gimbal actuator 94 that had previously been connected to return and also connecting the port that previously had pressure applied to it to be connected to return. Those port configurations cause Roll gimbal actuator 94 to retract. If no signal is applied to Roll gimbal directional control valve 92 the position of Roll gimbal actuator 94 is free to move without restriction since its ports are interconnected in Roll gimbal directional control valve 92. The vehicle to which Roll gimbal actuator 94 is connected may move freely in roll attitude within the limits of its mounts without exerting force on the roll gimbal of Gyroscope 10.

Roll gimbal level sensor 96 determines the direction and amount that Roll gambal actuator 94 needs to move to cause the attitude of Gyroscope 10 to be level in Roll. Roll gimbal level sensor 96 sends Roll gimbal level sensor signal 244 to Computer 50 designating the direction and magnitude of the existing roll gimbal attitude deviation from level. Computer 50 sends Roll gimbal directional control valve signal 246 to Roll gimbal directional control valve 92 to cause Roll gimbal actuator 94 to extend or retract appropriately to return the attitude of the roll gimbal to level and therefore a zero Roll gimbal level sensor signal 244. The rate at which Roll gimbal actuator 94 moves to extend or retract is controlled by Roll gimbal needle valve 90. Roll gimbal needle valve 90 is a conventional needle valve that controls the flow rate of fluid through it by its internal conformation. It is manually set to adjust the attitude correction rate of the roll attitude of Gyroscope 10. When Roll gimbal level sensor signal 244 reaches zero, the roll attitude of gyroscope 10 is level. Computer 50 terminates Roll gimbal directional control valve signal 246. The termination of Roll gimbal directional control valve signal 246 causes Roll gimbal directional control valve 92 to be configured in the bypass condition. The ports connected to Roll gimbal actuator 94 are now interconnected and Roll gimbal actuator 94 is free to move unimpeded. The pressure and return ports of Roll gimbal directional control valve 92 are blocked.

When Roll gimbal sensor signal 244 and Pitch gimbal sensor signal 240 are at zero, the attitude of Gyroscope 10 is level. As the vehicle attitude changes in pitch the attitude is measured by Pitch gimbal angle transducer 116. Pitch attitude signal 270 is sent to Computer 50. Computer 50 may have programs installed that require the use of pitch attitude. As the vehicle attitude changes in roll the attitude is measured by Roll gimbal angle transducer 118. Vehicle roll attitude signal 272 is sent to Computer 50. Computer 50 may have programs installed that require the use of roll attitude.

The hydraulic fluid under pressure pumped by the hydraulic motor pumps driven by either Engine A 52, Engine B 60 or both running together is presented to a common hydraulic line connecting the components of the system. That common line will be called the "plenum". Accumulator 46 is connected to the plenum. Accumulator 46 is a conventional hydraulic pneumatic accumulator that contains hydraulic fluid under pressure typically separated by a flexible membrane from a section of the accumulator containing an inert gas at a pre-charged pressure. As the pressure of the hydraulic fluid varies the inert gas is compressed or allowed to expand. While the compressed gas stores some energy it also provides a means to absorb pressure transients generated by various hydraulic switching actions. As the pressure changes Accumulator pressure transducer 104 measures that pressure.

The hydraulic system is nominally held at a given pressure that is called system pressure As the system pressure changes from action of its components, Computer 50 using inputs from the various system sensors and transducers takes appropriate action to return system pressure to its nominal level.

The flywheel of gyroscope 10 is driven in rotation by Gyro motor pump 12.which is connected by a conventional spline to the axle shaft of the wheel of Gyroscope 10. Gyro motor pump 12 is a conventional variable displacement hydraulic motor pump that may function as a motor or as a pump depending upon the configuration of its ports. If pressure is applied to one of its ports and the other port is connected to return it will function as a motor. If those ports are reversed and it is driven by a prime mover, it will function as a pump. The speed and torque generated by the motor pump functioning as a motor is controlled by its physical internal displacement. The amount of fluid pumped when functioning as a pump depends upon its physical internal displacement. That displacement is controlled by an electrical signal. The determination as to whether it will function as a motor or a pump is controlled by Gyro directional control valve 14. Gyro directional control valve 14 is a 4 way hydraulic valve that in response to an electrical signal configures the ports of Gyro motor pump 12 to function as a motor or as a pump. Gyro speed signal 204 that is derived from a transducer that is an integral part of Gyro motor pump 12 is sent to Computer 50. Gyro speed signal 204 shows the speed of Gyro motor pump 12 and therefore the speed of Gyroscope 10 since Gyro motor pump 12 is directly connected to Gyroscope 10. If Gyro speed signal 204 shows that Gyroscope 10 is at or below its lower preset speed limit Computer 50 imitates the Engine operation sequence.

As either Engine A 52 or Engine B 60 or both are operated, hydraulic fluid is pumped into the plenum. Accumulator 46 is connected to the plenum and its internal pressure rises. Accumulator pressure sensor 104 measures that pressures and sends Accumulator pressure signal 220 to Computer 50. Computer 50 sends Gyro directional control valve signal 200 to Gyro directional control valve 14 to cause Gyro motor pump 12 to function as a motor and Gyro motor pump displacement signal 250 to Gyro motor pump 12 to increase the speed of Gyroscope 10. As Gyro motor pump 12 runs increasing the speed of Gyroscope 10 it uses energy being provided as hydraulic pressure by accumulator 46. The Pressure in Accumulator 46 declines until it reaches system pressure at which time Computer 50 sends Gyro motor pump displacement signal 250 to Gyro motor pump 12 to adjust the displacement of Gyro motor pump 12 to maintain system pressure in Accumulator 46.

That action continues until Gyroscope 10 reaches its upper preset speed limit. Gyro speed signal 204 which also is the speed of Gyro motor pump 12 is sent to Computer 50. When the preset upper limit speed limit of Gyroscope 10 is reached, Computer 50 shuts off the operating Engine A 52 or Engine B 60 or both.

If the vehicle is at rest and no energy is required for its operation the pressure in Accumulator 46 remains constant at system pressure. Computer 50 having received Accumulator pressure signal 220 sends Gyro directional control valve signal 200 to Gyro directional control valve 14 to cause Gyro motor pump 12 to function as a pump. Computer 50 also sends Gyro motor pump displacement signal 250 to Gyro motor pump 12 reducing its displacement to minimum. Additionally, Computer 50 sends Bypass signal 208 to Bypass valve 16 to cause it to move to its bypass condition. Bypass valve 16 is a two way hydraulic valve that is spring loaded to the position that allows free passage to fluid serving the system When bypass signal 208 is applied to Bypass valve 16 it switches the fluid flow being pumped by Gyro motor pump 12 functioning as a pump and being drive by the wheel of Gyroscope 10 back to the inlet of Gyro motor pump 12 and to return. Gyro motor pump 12 and the wheel of Gyroscope 10 now spin unimpeded.

If the vehicle is to be moved, Forward reverse signal 260 is sent to Computer 50 selecting the direction of travel. Forward reverse signal 260 and Speed command signal 256 are electrical signals that may be generated by a position of a switch or lever (throttle) available to an operator, may be generated by an on board program or may be a signal generated from a remote source. Forward reverse signal 260 is presented with three alternatives. It may require forward motion with a forward signal to Computer 50, It may require reverse motion with a reverse signal to Computer 50 or it may remove any signal to computer 50 defining restriction to motion thus causing a parking brake function.

If Forward reverse signal 260 is presented to move the vehicle forward, Speed command signal 256 is sent to Computer 50. Computer 50 cancels any Brake command signal 258 that may exist. Computer 50 sends Forward directional control valve signal 214 to Forward directional control valve 22 to configure Drive motor pomp 20 to function as a motor. Forward directional control valve 22 is a 4 way hydraulic valve that in response to an electrical signal configures the ports of Drive Motor pump 20 to function as a motor or as a pump. It is spring loaded so that when no signal is applied to Forward drive directional control valve 22, its ports connected to Drive motor pump 20 as well as those connected to pressure and return are blocked.

Drive motor pump 20 s directly connected to Vehicle differential 26, which in turn is connected to Vehicle wheel and axle 28. With Forward directional control valve signal 214 applied to Forward directional control valve 22 hydraulic pressure is applied to Drive motor 20 causing it to apply power to Vehicle differential 26 and Vehicle wheel and axle 28 causing the vehicle to move. The amount of motion and the rate of that motion is controlled by Drive motor pump displacement signal 248. Responding to the magnitude of Speed command signal 256, Computer 50 sends the appropriate level of Drive motor pump displacement signal 248 to Drive motor 20. The vehicle now moves forward at the rate required by the magnitude of Speed command signal 256. If vehicle cruise control is desired, Cruise control signal 262 is applied to Computer 50. The speed of Drive motor pump 20 is fed to Computer 50 by Drive motor speed signal 210. Drive motor signal 210 identifies the direction of travel of the drive motor and therefore of the vehicle, as well as its speed. Computer 50 now alters the magnitude of Drive motor pump displacement control signal 248 as necessary to maintain the existing level of Drive motor pump speed signal 210 and therefore a constant speed of the vehicle. Cruise control function may be cancelled by a Brake command signal 258 or the removal of Cruise control signal 262. If reverse direction is selected by Forward reverse signal 260 and a Speed command signal 256 is issued, Computer 50 sends Reverse directional control valve signal 212 to Reverse directional control valve 24 to cause Drive motor pump 20 to function as a motor but to run in the reverse direction. Reverse directional control valve 24 is a 4 way hydraulic valve that in response to an electrical signal configures the ports of Drive Motor pump 20 to function as a motor or as a pump. It is spring loaded so that when no signal is applied to Reverse drive directional control valve 24, its ports connected to Drive motor pump 20 as well as those ports connected to pressure and return are blocked. With Reverse directional control valve signal 212 applied to Reverse directional control valve 24 hydraulic pressure is applied to Drive motor 20 causing it to apply power to Vehicle differential 26 and Vehicle wheel and axle 28 causing the vehicle to move. The amount of motion and the rate of that motion are controlled by Drive motor pump displacement signal 248. Responding to the magnitude of speed command signal 256, Computer 50 sends the appropriate level of Drive motor pump displacement signal 248 to Drive motor 20. The vehicle now moves in reverse at the rate required by the magnitude of Speed command signal 256.

Any time the vehicle is being driven either forward or reverse by Drive motor pump 20, hydraulic fluid is drawn from the plenum and therefore from Accumulator 46. The pressure in Accumulator 46 declines as identified by Accumulator pressure signal 220. Computer 50 recognizing a lowered pressure in Accumulator 46 takes appropriate action to return Accumulator 46 pressure to system pressure level.

The hydraulic fluid required to return the pressure in Accumulator 46 to system level is derived from Engine A 52, or Engine B 54 or both or from Gyroscope 10. If gyroscope 10 is at a speed above its minimum preset level as identified by Gyro speed signal 204 Engine A 52 or Engine B 60 are not running. Therefore the hydraulic fluid required to return system pressure to Accumulator 46 and to activate Drive motor pump 20 is derived from Gyroscope 10. With Gyroscope 10 running at a speed above its minimum level, Computer 50 sends Gyro directional control valve signal 200 to Gyro directional control valve 14 to configure Gyro motor pump 12 to function as a pump. With no signal applied to Bypass valve 16 hydraulic fluid pumped by Gyro motor pump 12 being driven by Gyroscope 10, is sent to the plenum. Computer 50 sends Gyro motor pump displacement signal 250 to Gyro motor pump 12 to adjust its displacement to control the flow of hydraulic fluid to Accumulator 46 to maintain its pressure at system level. As more or less Speed command signal 256 is required, more or less fluid is required to maintain system pressure in Accumulator 46 and the displacement of Gyro motor pump 12 is adjusted continuously to accommodate the requirements. If Gyroscope 10 is at or below its minimum speed, either Engine 52 or alternatively Engine B 60 is started using the "engine operation sequence" to supply the required hydraulic fluid to not only support the need of Drive motor pump 20 and to maintain system pressure in Accumulator 46 but also to bring gyroscope 10 to its upper energy storage limit. "Gyro energy storage sequence" is followed to bring the speed and therefore the upper limit of energy stored in Gyroscope 10.

When the upper limit of energy storage in Gyroscope 10 is reached, as identified by Gyro speed signal 204 whichever of Engine A 52 or Engine B 60 has been running is shut off and the hydraulic fluid to support the action of Drive motor 20 is again derived from Gyroscope 10.

Braking and restraining motions of the vehicle may be required. Brake command signal 258 is an electrical signal that may be generated by a position of a switch or lever (brake pedal) available to an operator, may be generated by an on board program or may be a signal generated from a remote source If there is a requirement to restrain the vehicle but not at a braking level and if the vehicle is moving forward as identified by Drive motor pump speed signal 210, Computer 50 returns Speed command 256 to zero and sends Forward Directional control valve signal 214 to Forward directional control valve 22 to configure Drive motor pump 20 to function as a pump. Computer 50 sends a small magnitude Drive motor pump displacement signal 248 to Drive motor pump 20. Drive motor pump 20 now functioning as a pump and being driven by the vehicle motion via Vehicle differential 26 and Wheel and axle 28 pumps hydraulic fluid into the plenum and Accumulator 46 thus raising the pressure in Accumulator 46. Accumulator pressure sensor 104 sends Accumulator pressure signal 220 to Computer 50 identifying that increased level of pressure. Computer 50 sends Gyro directional control valve signal 200 to Gyro directional control valve 14 to configure Gyro motor pump 12 to function as a motor. Computer 50 also sends Gyro motor pump displacement signal 250 to Gyro motor pump 12 to adjust its displacement to cause Gyro motor pump 12 to increase the speed of gyroscope 10 at a rate that causes the pressure in Accumulator 46 to return to system pressure. The kinetic energy contained in the vehicle is now transferred into the energy storage level of Gyroscope 10 at a rate that simulates the engine drag function of a conventional vehicle If there is a requirement to brake the vehicle, Brake command signal 258 is issued. Computer 50 cancels any Speed command signal 256 that might exist. If the vehicle is moving forward as identified by Drive motor speed signal 210 Computer 50 sends Forward directional control valve signal 214 to Forward directional control valve 22 to configure it to cause Drive motor pump to 20 to function as a pump. Computer 50 also sends Drive motor pump displacement control signal 248 to Drive motor pump 20 to cause the displacement of Drive motor pump 20 to be that commanded by the magnitude of Brake command signal 258 Drive motor pump 20 functioning as a pump sends hydraulic fluid to Accumulator 46 thus raising the pressure of Accumulators 46. The rate at which the pressure in Accumulator 46 increases and therefore the braking action on the vehicle is a function of the magnitude of Brake command signal 258. The increased Accumulator pressure signal 220 is sent to Computer 50. Computer 50 sends Gyro directional control valve signal 200 to Gyro directional control valve 14 to configure it to cause Gyro motor pump 12 to function as a motor. Computer 50 also sends Gyro motor pump displacement signal 250 to Gyro motor pump 12 in a magnitude that increases the displacement of Gyro motor pump 12 sufficiently to cause the pressure of Accumulator 46 to return to system pressure. That displacement causes Gyroscope 10 to increase its speed and thus store the kinetic energy that was contained in the vehicle inertia.

Braking in the reverse direction of the vehicle is accomplished by issuing a Brake command signal 258 while the vehicle is moving in the reverse direction as identified by Drive motor speed signal 210. Brake command signal 258 is sent to Computer 50. Computer 50 cancels any Speed command signal 256 that might exist. If the vehicle is moving in reverse as identified by Drive motor speed signal 210 Computer 50 sends Reverse directional control valve signal 212 to Reverse directional control valve 24 to configure it to cause Drive motor pump to 20 to function as a pump. Computer 50 also sends Drive motor pump displacement control signal 248 to Drive motor pump 20 to cause the displacement of Drive motor pump 20 to be that commanded by the magnitude of Brake command signal 258. Drive motor pump 20 functioning as a pump sends hydraulic fluid to Accumulator 46 thus raising the pressure of Accumulators 46. Accumulator pressure signal 220 is sent to Computer 50. Computer 50 sends Gyro directional control valve signal 200 to Gyro motor pump directional control valve 14 to configure it to cause Gyro motor pump 12 to function as a motor. Computer 50 also sends Gyro motor pump displacement signal 250 to Gyro motor pump 12 in a magnitude that increases the displacement of Gyro motor pump 12 sufficiently to cause the pressure of Accumulator 46 to return to system pressure. That displacement causes Gyroscope 10 to increase its speed and thus store the kinetic energy that was contained in the vehicle inertia even when the vehicle had been traveling in reverse.

The vehicle in which the system is installed when moving contains kinetic energy that is a function of its inertia. When the vehicle is braked or its motion restrained from a zero throttle position, the kinetic energy of the vehicle is reduced until it has been entirely dissipated when the vehicle is stopped. In the event that the vehicle climbs a hill additional energy is required to overcome the gravitational effect. When the vehicle goes down the hill it acquires additional kinetic energy as its inertia increases. To control the increasing speed of the vehicle, initially a zero Speed command signal 256 might be issued. That would move the increasing energy being derived from the downhill action of the vehicle into Gyroscope 10. Ultimately a Brake command signal 258 might be issued that would increase the rate at which energy derived from the downhill action of the vehicle was derived. Alternatively if cruise control had been initiated, the increased Drive motor pump displacement signal 248 would increase the displacement of Drive motor pump 12 as necessary to pump as much fluid as necessary to provide the necessary vehicle restraining action to maintain the existing speed of the vehicle. That action would increase the pressure in Accumulator 46 resulting in Accumulator pressure transducer 104 sending Accumulator pressure signal 220 to Computer 50. Computer 50 sends Gyro motor pump displacement signal 250 to Gyro motor pump 12 in a magnitude as necessary to maintain the pressure in Accumulator 46 at system pressure. That increased displacement of Gyro motor pump 12 increases the speed of Gyroscope 10. A circumstance could arise in which the continued increasing inertia being derived form the down hall or other braking action could increase the speed of Gyroscope 10 above its upper limit. When Gyroscope reaches its upper preset limit speed and the pressure in Accumulator 46 continues to rise, Computer 10 sends gyro directional control valve signal 200 to Gyro directional control valve 14 to configure Gyro motor pump 12 as a pump. It also sends Bypass valve signal 208 to Bypass valve 16 to place it in the bypass position. Those two actions cause Gyroscope 10 to spin freely without any exchange of energy. Pressure in Accumulator 46 continues to increase until it reaches the relief pressure level of Pressure relief valve 48. Pressure relief valve 48 is a conventional pressure relief valve that when its preset pressure is reached, allow the flow of hydraulic fluid through it to return. The inertial energy of the vehicle now being derived from the downhill or braking actions is dissipated by Pressure relief valve 48.

While moving either in the forward or reverse direction of the vehicle the action of Drive motor pump 20 to pump hydraulic fluid against system pressure provides a braking action on the vehicle. At full displacement of Drive motor pump 20, sufficient braking force is available to prevent any motion of wheel and axle 28 allowing for holding power when the vehicle is stopped.

If a parking brake action is required, Forward reverse signal 260 is removed. When Drive motor pump speed signal 210 identifies zero wheel speed, Computer 50 removes any existing Forward directional control valve signal 214 and Reverse directional control valve signal 212 which action blocks the ports of those two directional controls valves that are connected to Drive motor pump 20. That action provides a hydraulic lock to Drive motor pump 20 preventing it from turning. Since it cannot turn neither can the wheels of the vehicle. If a traumatic event were to occur that forced the vehicle to move, pressure may build up inside Drive motor pump 20 to a dangerous level. Pressure relief valve 32 which is a conventional pressure relief valve is connected to the ports of Drive motor pump 20 to relieve any abnormal pressure built up in Drive motor pump 20 thus relieving any dangerous level of pressure.

If it became necessary to move the vehicle without on board electrical power, Manual bypass valve 30 is opened to allow free flow of hydraulic fluid between the pressure and return ports of Drive motor pump 20 allowing the wheels of the vehicle to turn freely.

Electrical power is required for vehicle operation. Battery 19 provides that power. Battery voltage signal 264 is sent to Computer 50. When Battery voltage signal 264 identifies that the voltage of Battery 19 is at a preset lower limit, Computer 50 sends Generator on-off signal 216 to Generator on-off valve 44 to apply hydraulic pressure to Generator hydraulic motor 42. Generator hydraulic motor 42 is a conventional fixed displacement hydraulic motor that operates when at full system pressure at a speed appropriate for Generator 40 and is physically connected to Generator 40. Generator 40 is a conventional vehicle generator ordinarily used for vehicle battery charging. Generator on-off valve is a conventional 2 position hydraulic valve that is operated by an electrical signal. When turned on it allows the free flow of hydraulic fluid to Generator hydraulic motor 42 Battery voltage signal 264 is sent to Computer 50. When Battery voltage signal 264 reaches a level showing that Battery 19 is fully charged, Computer 50 sends Generator on-off signal 216 to Generator on-off valve 44 to close and thus shut off fluid flow to Generator hydraulic motor 42

The system contains the capability of acquiring energy to be stored in Gyroscope 10 from an external electrical source such as the electric grid. Plug in motor 70 is a conventional 110-volt motor capable of operating on ordinary house power. It is connected to Plug in hydraulic pump 72. Plug in hydraulic pump 72 is a conventional fixed displacement hydraulic pomp that when operate at the speed of Plug in motor 70 will pump hydraulic fluid at system pressure. When the vehicle is stopped and being unused Plug in motor 70 may be plugged into any convenient electrical receptacle. If when it is plugged in, Gyroscope 10 is below its preset upper speed limit, as identified by Gyro speed signal 204, Computer 50 sends Plug in motor on off signal 230 to Plug in motor 70 to turn it on. As it runs hydraulic fluid being pumped by Plug in hydraulic pump 72 is pumped into the plenum and raises the pressure in Accumulator 46. The system being powered by Battery 19 is operable. The increased pressure in Accumulator 46 is sent via Accumulator pressure signal 220 to Computer 50. Computer 50 sends Gyro directional control valve signal 200 to Gyro directional control valve 14 to configure it to cause Gyro motor pump 12 to function as a motor. Computer 50 also sends Gyro motor pump displacement signal 250 to Gyro motor pump 12 in such magnitude that the displacement of Gyro motor pump 12 increases by an amount to reduce the pressure in Accumulator 46 to system pressure. That displacement of Gyro motor pump 12 increases the speed of Gyroscope 10. The speed of Gyroscope 10 is fed to Computer 50 by Gyro speed signal 204. When Gyro speed signal 204 indicates that Gyroscope 10 has reached its preset upper speed limit, Computer 50 send Plug in motor on off signal 230 to Plug in motor 70 to shut it off.

As vehicles travel over the surface, they encounter bumps in the road surface. The energy associated with the bounce of the wheels may be captured. Typically shock absorbers are employed to mitigate the vibration and stresses induced on the vehicle as the wheels encounter bumps in the road surface. In the present invention the bouncing motion of the wheels is restrained by devices that convert the vertical motion of the wheel to hydraulic energy. Conventional hydraulic cylinders are used to support each wheel replacing the conventional shock absorbers. The hydraulic cylinders are called Bump generators 74. A four wheeled vehicle is shown in FIG. 1. Each Bump generator 74 has an inlet and an outlet port. The inlet port is vented to atmosphere. Each outlet port is connected to Accumulator 46 through Outlet check valve 78 and a flow control valve. Each check valve is a device that allows the flow of hydraulic fluid in one direction only. A flow control valve is a device that modulates the flow of hydraulic fluid through it as a function of an electrical signal. As the vehicle travels over the road surface as it encounter a bump, the wheel hitting that bump will bounce upward as a result of the impact with that bump. As it does it compresses the fluid contained in the appropriate bump generator 74. That fluid is sent through the associated Outlet check valve 78 and through the associated flow control valve to Accumulator 46 thus slightly increasing its pressure. After the bump has passed the wheel descends and as it does it draws in and replaces the hydraulic fluid that was sent to Accumulator 46 from the storage tank (return) through Inlet check valve 76. As the vehicle travels over the road many bumps are encountered and many small contributions are made to the pressure in Accumulator 46. Upon reaching a preset threshold of pressure, the Gyro energy storage sequence is implemented.

The rate of flow of hydraulic fluid to Accumulator 46 is controlled by an electrical signal to the flow control valves. The rate of flow controls the stiffness of the ride. If the flow control valve allows a large flow, the ride is appropriately soft and is stiffened as the signal level through the flow control valve is increased. If the vehicle is uniformly loaded with equal or nearly equal weight supported on each wheel, all Flow control valve signals 232 through 236 will be sent by Computer 50 in equal magnitude. Should the load be unevenly distributed the appropriate Flow control valve 232 through 236 will be adjusted by Computer 50 to appropriately restrict the flow of hydraulic fluid thus controlling Computer 50 Flow control valve signals 232 through 238 are derived from an onboard operator, an on board program or may be derived from a remote location. and may individually vary in magnitude according to each wheel load.

System Operation

The system when used to propel a vehicle replaces the conventional drive train. It overcomes the inherent inefficiencies and wasted energy losses from deceleration and braking with a system that maximizes propulsion efficiency. Additionally it virtually eliminates noxious emissions.

Assume a condition in which the vehicle that the propulsion system has been installed has been at rest for an extended period. Gyroscope 10 would be at rest, but the system pressure in Accumulator 46 would be at normal system pressure.

Further assume that the vehicle is to move forward immediately upon initiation. The speed at which it is to move forward is established by the magnitude of Speed command signal 256

Commands may be issued from signals generated by an on board mechanism such as a brake, throttle or switch, an onboard program or remote source of commands. To commence activity of the vehicle commands initiating system activity are issued. With the issuance of Forward reverse signal 260 to Forward directional control valve 22, the hydraulic lock of Drive motor pump 20 is removed That hydraulic lock is in place due to the internal port configuration of the directional control valves. At any time there is an absence of a vehicle Foreward or Reverse signal and the vehicle is at rest motion of Drive motor 20 is prohibited by a hydraulic lock. The Engine operation procedure is initiated using the energy stored in Accumulator 46 to provide the energy needed for the Engine operating procedure sequence. An electrical backup starter could be employed but is not required.

To move the vehicle forward, Forward reverse signal 260 is issued energizing Forward directional control valve 22 to configure the ports of Drive motor pump 20 to function as a motor. Drive motor pump displacement signal 248 is issued in the magnitude required for vehicle propulsion The vehicle now moves forward at a rate that is a function of the magnitude of Drive motor pump displacement signal 248. As the vehicle moves forward, hydraulic fluid is processed by Drove motor pump 20. The fluid to allow the operation of Drive motor pump 22 comes from Accumulator 46. Accumulator 46 receives its hydraulic fluid from the operation of the hydraulic pump typically Engine A motor pump 54 or Engine B motor pump 62 being driven by whichever Engine A52 or Engine B60 is operating.

The now operating engine running at its normal full speed produces more hydraulic fluid than is consumed by the operation of Drive motor pump 20. Resulting from the overabundance of hydraulic fluid from the hydraulic pump of the now operating engine, the pressure in Accumulator 46 rises above system pressure. Accumulator pressure signal 220 is sent to Computer 50. Computer 50 initiates Gyro energy storage sequence.

At the same time the level attitude of Gyroscope 10 is measured by Pitch gimbal level sensor 88 and Roll gimbal level sensor 96. Gyroscope 10 is leveled by the use of Gyroscope leveling sequence.

The increasing speed of Gyroscope 10 is sent to Computer 50 via Gyro speed signal 204. When Gyroscope 10 reaches its upper preset speed limit, Computer 50 terminates the appropriate engine ignition signal thus stopping the running engine. It also terminated the appropriate Engine directional control valve signal 224 or 228 to the appropriate directional control valve thus terminating any engine derived fluid flow.

As a result of the terminated flow of fluid from the engine, the hydraulic fluid being processed by Drive motor pump 20 coming from Accumulator 46 causes the pressure in Accumulator 46 to decline. As a result of Accumulator pressure signal 220 showing an Accumulator pressure below normal system pressure, Computer 50 sends Gyro directional control valve 200 signal to Gyro directional control valve 14 to configure Gyro motor pump 12 to function as a pump. Computer 50 then modulates Gyro motor pump displacement signal 250 in magnitude to maintain system pressure in Accumulator 46. As the magnitude of speed command signal 256 changes the amount of fluid processed by Drive motor pump 20 varies and that variation is accommodated by maintaining system pressure in Accumulator 46.

As fluid is processed into Accumulator 46 from the output of Gyro motor pump 12 being driven by Gyroscope 10 the energy to pump that fluid causes Gyroscope 10 to decrease in speed. Gyro speed signal 204 is sent to Computer 50 and when it reaches the lower preset limit, Computer 50 initiates Engine operation procedure to activate the appropriate Engine A 54 or Engine B 60 depending upon which was last used. The now running engine not only provides the required hydraulic fluid to support the operation of the drive motor propelling the vehicle but also brings the gyroscope up to speed.

Had Forward reverse signal 260 been directed to cause the vehicle to move in reverse rather than forward immediately upon starting, the same sequence of events would occur except that Computer 50 would have sent Forward reverse signal 260 to Reverse directional control valve 24 causing the vehicle to move in reverse at the rate commanded by Drive motor pump displacement signal 248.

Any time Drive motor pomp 20 is functioning as a pump, being driven by the motion of the vehicle, kinetic energy contained in the inertia of the moving vehicle is expended and the vehicle slows. The rate at which the kinetic energy is expended and therefore the rate at which the vehicle slows is a function of the volume of hydraulic fluid pumped.

The vehicle being in motion is moving at a rate required as a result of Speed command signal 256. The hydraulic fluid being processed may be derived from that being pumped by Gyro Motor pump 12. If the vehicle is to slow to a speed lower than in existence without braking the magnitude of Speed command signal 256 is reduced. Restraining forces such as hill climb, rolling friction and windage forces cause the vehicle to slow. As the vehicle slows less hydraulic fluid is processed by Drive motor pump 20 resulting in the need for Computer 50 to alter the displacement of Gyro motor pump 12 to reduce the flow of hydraulic fluid being pumped to maintain constant system pressure in Accumulator 46. If the reduced magnitude of the hydraulic fluid being processed by drive motor pump 12 was being supplied by a running engine, Computer 50 would have increased the displacement of Gyro motor pump 12 functioning as a pump to maintain constant system pressure in Accumulator 46 That action would have increased the rate of energy being stored in Gyroscope 10 and shortened the time the engine ran. With the vehicle moving forward the existing vehicle motion may need to be reduced at a rate that would result from having no propulsion supplied by the drive system In that case Speed command signal 256 is reduced to zero. A zero speed command causes Computer 50 to send Forward directional control valve signal 214 to Forward directional control valve 22 to cause Drive motor pump 20 to function as a pump. Computer 50 also sends Drive motor pump displacement signal 248 to Drive motor pump 20 to cause its displacement to be at a small displacement level. The inertia contained in the moving vehicle causes Drive motor pump 20 functioning as a pump to pump a small volume of fluid into Accumulator 46. As fluid is pumped against system pressure, the inertia of the vehicle is depleted at a rate established by the magnitude of the small Drive motor pump displacement signal 248. The hydraulic fluid being pumped by Drive motor pump 20 functioning as a pump raises the pressure in Accumulator 46 that is sensed by Computer 50 via Accumulator pressure signal 220.

Computer 50 sends Gyro directional control valve signal 200 to Gyro directional control valve 14 to cause Gyro motor pump 12 to function as a motor. Computer 50 modulates Gyro motor pump displacement signal 250 as necessary to maintain constant system pressure in Accumulator 46. The kinetic energy that had been contained in the vehicle is now transferred during vehicle deceleration into energy stored in Gyroscope 10.

With the vehicle moving either in the forward or reverse direction, it may be necessary to apply braking action. Brake command signal 258 is issued. With the vehicle moving forward, Computer 50 sends Forward directional control valve signal 214 to Forward directional control valve 22 to cause Drive motor pump 22 to function as a pump. Alternatively had the vehicle been moving in the revere direction, Computer 50 would have sent Reverse directional control valve signal 212 to Reverse directional control valve 24 to cause Drive motor pump 20 to function as a pump. In either direction of motion of the vehicle Drive motor pump 20 functions as a pump. Drive motor pump displacement signal 248 is applied to Drive motor pump 20 in a magnitude as necessary to result in the required braking action.

The hydraulic fluid being pumped by Drive motor pump 20 raises the pressure in Accumulator 46, which is sensed by Accumulator pressure transducer 104. Accumulator pressure signal 220 is sent to Computer 50. Computer 50 sends Gyro directional control valve signal 200 to Gyro directional control valve 12 to configure Gyro motor pump 12 to function as a motor. Computer 50 modulates Gyro motor pump displacement signal 250 as necessary to maintain constant system pressure in Accumulator 46.

With the vehicle moving forward a hill may be encountered. To climb the hill and maintain the speed commanded by Speed command signal 256 or if Cruise control signal exists Computer 50 increases Drive motor pump displacement signal 248. The resulting displacement increases the energy output of Drive motor pump 20 as necessary to maintain the commanded speed. As the vehicle goes down the hill it goes faster and acquires more kinetic energy. As it goes faster, the speed of Drive motor pump 20 increases. As its speed increases, less fluid flow is required to overcome the restraining forces. Ultimately, if the speed continues to increase and there is no change in Speed command 256, or a Cruise control command 262 exists, the hydraulic pressure drop across Drive motor pump 20 falls to zero. Drive motor pump transducer 114 sends Drive motor pump pressure signal 268 to Computer 50. Computer 50 sends Forward directional control valve signal 214 to Foreword directional control valve 22 to configure Drive motor pump 20 as a pump. As the speed of the vehicle going downhill tends to increase, Computer 50 sends Drive motor displacement signal 248 to Drive motor 12 to modulate its displacement as necessary to maintain the speed commanded by Speed control signal 256 or Cruise control signal 262 while the vehicle is going down the hill.

The hydraulic fluid pumped by Drive motor pump 20 increases the pressure in Accumulator 46. Accumulator pressure transducer 104 sends Accumulator pressure signal 220 to Computer 50. Computer 50 initiates Gyro Energy storage sequence to maintain constant system pressure in Accumulator 46. The speed of the vehicle going downhill is maintained at the magnitude of speed command 256 or the speed at which Cruise control signal 262 was issued. The increasing energy gained by the vehicle going down hill is stored in Gyroscope 10.

A circumstance could exist in which the energy gained from any of the restraining forces occurs at a time when the energy stored in gyroscope 10 is already at a maximum. Computer 50 as a result of Gyro speed signal 204 moves the position of Bypass valve 16 to the bypass position and reduces the displacement of Gyro motor pump 12 to a minimum allowing Gyroscope 10 to spin freely. The pressure in Accumulator 46 is allowed by Computer 50 to increases to a level that will open Pressure relief valve 48. The energy derived from the restraining forces is dissipated by Relief valve 48.

The vehicle, undergoing either decelerating action or braking action comes to a stop. When it does, Drive motor pump speed signal 210 falls to zero. Computer 50 terminates Forward directional control valve signal 214 or Reverse directional control valve 212, which ever had been in place. Forward directional control valve 22 or Reverse directional control valve 24, as a result of its internal spring closes all the ports of the directional control valves. Under that circumstance, a hydraulic lock is placed on the action of Drive motor 20. Drive motor 20 being unable to turn holds the Wheel and axle 28 of the vehicle stationary. When Speed signal 256 is again issued, whichever direction is selected by Forward reverse signal 260, Computer 50 sends either Forward directional control valve signal 214 or Reverse directional control valve signal 212 whichever directional control valve is selected to configure Drive motor pump 20 to function as a motor. With pressure applied to Drive motor pump 20, the vehicle moves in the direction selected.

Had the vehicle been stopped on a hill, either facing up or down, the locked Drive motor pump would have held the vehicle stationary until a speed signal was issued causing the vehicle to move.

As the vehicle is driven, turns in direction are required. As the vehicle turns centrifugal force causes the vehicle to roll outward from the center of the turn. As the rate of turn and speed increases, the magnitude of the centrifugal force increases. Ultimately if the turn rate and speed continues to increase the centrifugal force causes the vehicle to roll over. Gyroscope 10 is mounted to the frame of the vehicle. As the vehicle rolls, Gyroscope 10 remains inertially fixed in space. To change the level attitude, or to presses the gyroscope from the level attitude requires a very large force that is a function of the mass of the gyroscope, its radius and its rotational speed. As the vehicle rolls the angle between the roll gimbal of the level gyroscope and the vehicle frame changes. The maximum angle that the vehicle is allowed to roll is controlled by stops built into the roll gimbal of the gyroscope. When the roll angle of the vehicle reaches the stops of the gyroscope, the rolling force of the vehicle is imposed on the inertial stiffness of the gyroscope in a direction to cause its level attitude to change. The precession force of the gyroscope is very much larger than any force that can be imposed upon it by a rolling vehicle Therefore when the roll angle of the vehicle reaches the limit of the stops of the roll gumball of the gyroscope, the vehicle can roll no further and roll over accidents are prevented. The vehicle may slide sideways resulting from the centrifugal force but it cannot roll beyond the limits of the stops of the gyroscope.

Circumstances may arise or failures may occur that require emergency means of restraining the vehicle. Typically conventional braking systems remain in place for such an emergency. Certain programs may be used that require the knowledge of vehicle attitude. Active suspension systems, cornering control systems and many military applications require the use of a stable platform. Gyroscope 10 provides that stable platform. Vehicle attitude in pitch and toll are continuously provided to Computer 50 by means of Vehicle pitch attitude signal 270 and Vehicle roll attitude signal 272.

Conclusions Ramifications and Scope

Many advantages over existing propulsion systems become apparent. The enormous inefficient engine and its associated transmission are replaced with a high efficiency direct drive motor. No longer is the speed of the vehicle controlled by the speed of the engine. The speed of the vehicle is controlled by a high efficiency hydraulic motor whose speed is varied without a degradation of efficiency resulting in the required vehicle speed. The engine or prime mover used to acquire the required propulsion power is small and runs only intermittently at its most efficient speed to fill an energy storage medium. The storage medium supplies the widely varied energy demands as the vehicle is used. The storage medium is a conventional flywheel mounted to accommodate the motion of the vehicle. It doesn't degrade with use, has extreme life and uses conventional technology in its design.

Braking and deceleration systems capture the kinetic energy that was spent in accelerating the vehicle. That energy is recaptured and stored in the flywheel to be used again in an ensuing acceleration less only the efficiency loss of the components. Energy used to climb a hill is returned as the vehicle goes down the hill, again except for the small component efficiency losses.

Energy derived from the commercial grid may be used to provide extensive vehicle range without the use of any fuel at all.

Energy is even captured from the bumps in the road.

The flywheel is a gyroscope. As such it maintains its inertial attitude in space. Active suspension management systems steering stabilization systems as an example or military systems requiring a stable platform may use the gyroscopic function. Even more important, by the use of angle stops mounted on the gyroscope, vehicle roll over accidents are inhibited thus saving many lives.

Conventional vehicle propulsion systems typically require an onboard operator. Commands are generated by mechanical means activating mechanical devices. Electrical signals generate the commands in this propulsion system. As such those commands may come from a transducer controlled by an onboard operator. Those commands may equally as well be derived from an onboard program directing the operation of the vehicle. Alternatively they could come from a remote operator.

While the above description contains many specifities these should not be construed as limitations on the scope of the invention but rather an exemplification of one of several preferred embodiments thereof. Many variations are possible.

As an example, flow control valves could be used to modulate the flow of hydraulic fluid to and from the motor pumps. Another example would be the ability to physically control the vehicle attitude by computerized pressure application to the actuators associated with the suspension.

Accordingly the scope of the invention should be determined by the appended claims and their legal equivalents. It will be readily apparent to those skilled in the art that various changes may be made without departing from the scope of the invention.

I claim:

1. A hydraulically driven propulsion and energy recovery system using inertial energy storage for ground based, wheeled motor vehicle, the system comprising:
   (a) a central computer processor capable of processing input and output electrical signals through appropriate electronics to functional components of the system,
   (b) an energy management program stored on and controlled by the computer processor which is adapted to acquire, store, process and dispense energy derived from and used by electrical, mechanical and, hydraulic components of the system to propel the vehicle,
   (c) a braking and deceleration program stored on and controlled by the computer processor which is adapted to capture inertial energy generated by the vehicle while the vehicle is in motion, and
   (d) inertial stabilization means derived from a gyroscope having an inertial wheel to inhibit vehicle rollover, so that the force needed to inhibit vehicle rollover is generated from an inertial stiffness of the inertial wheel of the gyroscope.

2. The hydraulically driven propulsion and energy recovery system of claim 1 further comprising program means adapted to control the motions of the vehicle in response to onboard sensor signals, onboard programs or from remote signals generated elsewhere.

3. The hydraulically driven propulsion and energy recovery system of claim 1 wherein energy is acquired and processed from an onboard prime mover, inertia wheel of a gyroscope, bumps in the road, or the commercial electrical grid, the energy then being transmitted to a hydro pneumatic pressure sensing accumulator, one or more directional control valves and one or more hydraulic motor pumps to assist in propelling the vehicle.

4. The hydraulically driven propulsion and energy recovery system of claim 1 wherein energy is stored in the gyroscope's inertial wheel and processed into and out of the gyroscope by the use of a hydraulic motor pump being directly connected to the inertia wheel.

5. The hydraulically driven propulsion and energy recovery system of claim 1 wherein the inertial energy is captured from the moving vehicle by braking and deceleration actions and is derived by a hydraulic motor pump being connected to the driving wheels of the moving vehicle.

6. The hydraulically driven propulsion and energy recovery system of claim 5 wherein the inertial energy captured is transmitted and stored in the inertia wheel of a gyroscope by action of the hydraulic motor pump.

* * * * *